Patented Aug. 1, 1939

2,168,040

UNITED STATES PATENT OFFICE 2,168,040

COATING COMPOSITION

Walter Nebel, Parlin, N. J., assignor to E. I. du Pont de Nemours & Company, Wilmington, Del., a corporation of Delaware No Drawing. Application November 30, 1936, Serial No. 113,466

21 Claims. (Cl. 134—79)

This invention relates to new cellulose nitrate coating compositions, particularly adapted for finishing wood surfaces, whereby desirable improvements in working properties, clarity, brilliancy and general durability are secured.

A wood surface for furniture manufacture on which a finish is to be applied must be prepared properly. Beauty of finish depends to a great extent upon knowledge of how a surface should be prepared and the skill which is used in carrying out operating procedures. Following the application of the stain and filler, selection of the proper coating composition is essential. A clear or transparent lacquer coating should possess depth and bring out the true beauty of the wood grain. The lacquers of the present day usually contain a cellulose nitrate of low viscosity, and certain resins which, when combined therewith, produce a coating that is frequently deficient in apparent depth and clarity. The resin ingredient is one of the most important components of modern lacquers, especially those which are manufactured for application to wood surfaces. The latter type usually contains a higher proportion of resin to cellulose nitrate than is ordinarily found in cellulose nitrate compositions designed for finishing automobiles.

It is well-known that the rubbing and polishing of wood surfaces coated with lacquer requires a very considerable expenditure of time and manual labor. Rubbing is employed mainly to produce a satisfactory leveling and smoothing of the lacquer coating. In addition to increasing "body" or solid content, adhesiveness, and gloss, the resin constituent of the lacquer also functions in such a manner as to assist in rubbing of the finish. However, too high a resin content is likely to result in poor flexibility, uneven flow and unsatisfactory rubbing properties of the finish.

The teachings of the present invention provide for the production of a cellulose nitrate composition which affords numerous improvements in working properties and appearance when applied to wood surfaces.

This invention has as an object the provision of a composition which, when applied to surfaces of wood and the like, affords a finish of extraordinary apparent depth and clarity. Another object of the invention is the provision of a composition which imparts exceptionally smooth flow to the lacquer film. A further object of the invention is the provision of a composition which affords improved rubbing characteristics, with attendant economy in expenditure of time and manual labor. A further and more particular object of the invention is the provision of a lacquered wood surface which is characterized by superior clarity, brilliancy, depth, color and general beauty. Other objects will become apparent as the description of the invention proceeds.

These objects are accomplished by coating wood and the like surfaces with cellulose nitrate compositions containing as an essential ingredient, a vegetable oil previously treated with an oxide of certain metals as hereinafter more fully described.

The new compositions consist essentially of low viscosity cellulose nitrate, resins or gums, solvents, diluents, and a special softener, such as magnesia treated vegetable oil.

The following examples illustrate the preferred embodiment of the invention:

Example #1

| | Per cent |
|---|---|
| Cellulose nitrate (low viscosity) | 9.1 |
| Damar resin (dewaxed) | 13.9 |
| Ethyl alcohol (denatured) | 20.4 |
| Toluol | 21.6 |
| Butyl acetate | 20.0 |
| Ethyl acetate | 9.0 |
| Butyl alcohol | 3.0 |
| Cocoanut oil (specially treated) | 3.0 |
| | 100.0 |

The viscosity characteristic of the cellulose nitrate used in this example is about 3 seconds as determined in accordance with A. S. T. M. specifications D–301–33, Formula B. However, while cellulose nitrate of this viscosity characteristic is preferred, other cellulose nitrates of viscosity characteristics up to 5 seconds are also suited for the compositions of the invention.

Example #2

| | Percent |
|---|---|
| Cellulose nitrate (low viscosity) | 8.2 |
| Damar resin (dewaxed) | 12.5 |
| Ethyl alcohol (denatured) | 15.7 |
| Toluol | 28.6 |
| Butyl acetate | 21.0 |
| Ethyl acetate | 5.7 |
| Butyl alcohol | 3.0 |
| Cocoanut oil (specially treated) | 2.7 |
| Santicizer #10 | 2.6 |
| | 100.0 |

The viscosity characteristic of the cellulose nitrate used in this example is about 3 seconds as determined in accordance with A. S. T. M. specifications D–301–33, Formula B.

Example #2 represents a modification of Example #1 in which "Santicizer #10", a commercially available plasticizer, consisting essentially of ortho cresyl paratoluene sulfonate, is added to reduce the absorption of the oil used in commercial rubbing practices. In certain instances, particularly where careless workmanship is encountered, the use of a composition of the type described in Example #1, provides a finish which exhibits a hazy appearance, not typical of results secured when this lacquer is properly applied and rubbed. Therefore, in order to make the product more fool-proof and insure a finish characterized by the superior clarity and brilliance as provided by the inclusion of the specially treated oil, a proportion of the above described plasticizer is added. This modification prevents the embedding in the finish surface of small particles of pumice used with the oil in the rubbing operation and further improves the scratch and print resistance and toughness of the ultimate finish.

The damar resin is preferably added to the composition as a solution consisting of:

| | Percent |
|---|---|
| Toluol | 18.7 |
| Ethyl alcohol (denatured) | 37.3 |
| Damar resin (dewaxed) | 44.0 |
| | 100.0 |

The treated cocoanut oil shown in the examples is prepared as follows: 3.5% by weight of partially hydrated magnesium oxide is added to cocoanut oil and the mixture heated in an open aluminum kettle to 265° C. until solution is complete, particular care being taken to maintain a colorless product by careful temperature control. The treated oil is cut 50% in toluol for use in the lacquer compositions.

The following values are given by way of illustration of the changes effected in treating the vegetable oil:

| | Edible cocoanut oil | Magnesium treated cocoanut oil |
|---|---|---|
| Iodine number | 8.4 | 5.8 |
| Saponification number | 250 | 180 |
| Index of refraction | 1.460 (at 25° C.) | 1.456 |

The final lacquer compositions may be prepared by charging the several ingredients in the proportions shown into a conventional agitator type mixer and mixing until a homogeneous composition is obtained.

In the practice of the present invention, a coating of the improved lacquer composition is applied to the wood surface which has previously been stained and filled in the conventional manner, by any of the methods well known in the art, such as by spraying, brushing, dipping, etc. Finishes prepared from the new lacquer set quickly, and dry rapidly by evaporation. Conventional rubbing and polishing operations which follow thorough drying of the finish improve the effect of the lacquered surface and tend to "soften" and beautify the finish.

Other magnesium oxide treated vegetable oils, such as cottonseed, sunflower, castor (raw), linseed, China-wood, perilla, and hydrogenated cottonseed, or similar compounds produced by the reaction of an oxide of a metal of Group 2 of the Periodic Table, for example, the oxides of calcium, strontium, barium, cadmium, zinc, etc., with these vegetable oils, which have approximately the same refractive index, viscosity, saponification and iodine numbers as the treated cocoanut oil described in the examples, and are compatible with cellulose nitrate, may be utilized.

Alternative resins, such as ester gum, toxilic acid modified rosin esters, such as "Amberol" and "Beckacite", and other synthetic resins, which have equivalent properties of hardness, solubility and compatibility, may be utilized in the coating compositions of this invention.

In place of the ortho cresyl paratoluene sulfonate plasticizer shown in Example #2, other plasticizers may be used including the aryl sulfonamides, such as the ortho, meta and paratoluene ethyl sulfonamides and mixtures of these, xylene methyl sulfonamides, aryl and alkyl esters of phosphoric acid such as tricresyl, triphenyl and diethyl phosphates. The essential requirements for suitable plasticizers are that they exhibit solvent power for the cellulose nitrate or are at least entirely compatible therewith and of more importance that they are insoluble in the treated oil, since any appreciable degree of solubility will produce an undesirable gray haze in the ultimate finish. For this reason, the phthalate esters, such as diethyl and dibutyl phthalates, widely used in conventional cellulose nitrate compositions, are not suited for the compositions of the present invention.

Optimum conditions for securing the outstanding qualities for the type of compositions noted above are obtained when the cellulose nitrate-resin-treated vegetable oil ratios are within the range of 10–10–1 and 10–25–5 parts by weight, although improvements with respect to clarity and durability are apparent somewhat beyond the upper resin limit.

The conventional type wood lacquers maintain a ratio of approximately ten parts of cellulose nitrate to five parts of resin. It has been found that an increase in resin content to substantially greater than equal parts of cellulose nitrate to resin, although it provides body and imparts depth and clarity to the film, results in a finish of poor flexibility. If attempts are made to overcome such defects by the addition of a conventional plasticizer, a finish of poor print resistance and unsatisfactory rubbing properties is obtained. The presence of the magnesia treated cocoanut oil in the lacquer compositions of the present invention permits the use of a higher ratio of resin to cellulose nitrate, thereby providing a rigid, flexible finish of exceptional durability. Even with the best of previously available modern lacquers, there is evidence to indicate that the films are not elastic enough to withstand changes of temperature and great variations in humidity. Especially is this true when they are applied on a wood surface which expands and contracts to a measurable extent, causing so-called temperature checks crosswise of the wood grain which do not entirely close after the coating is once ruptured. The increased resin content permissible in the new compositions increases the power of the film to adhere to the surface to which it has been applied, and as a result minimizes checking effects which rapidly destroy the original beauty and life of the finish.

The coating compositions described herein may be utilized for finishing surfaces of wood articles such as furniture and fabricated woodwork. They are of particular merit in finishing surfaces where an unusually clear presentation of the wood grain is desired, an objective which has not been accomplished by the lacquers heretofore available. The commercial utility of the new lacquers has been established by their ready and increasing acceptance in the trade.

The coating compositions of the present invention are characterized by extraordinarily high solids for a given viscosity, thus providing obvious operating economies. Unusual brilliance, excellent clarity, and depth in the finish are secured. They bring out the true beauty of the wood to a degree never before obtainable with furniture lacquers. The coating cuts down faster than the conventional lacquers by permitting the rubbing oil to slightly soften the surface, and as a result requires less effort and time to rub a piece of furniture. The unusually smooth flow which characterizes the new compositions, with consequent absence of "orange peel", greatly simplifies the application and rubbing and polishing operations. The lacquer dries to a very durable, long-lived, beautiful finish which is remarkably resistant to printing, scratching, and moisture.

In the past many flat lacquers have obscured the beauty of the wood more than the clear lacquers. While the rubbed clear lacquer discloses the greatest improvement in apparent clarity, it is also possible to incorporate the same superior quality in a flat finish.

It is apparent that many widely different embodiments of the invention may be made without departing from the spirit and scope thereof; and, therefore, it is not intended to be limited except as indicated in the appended claims.

I claim:

1. Composition of claim 15 in which the oxide is magnesium oxide.

2. Composition of claim 15 in which the oxide is calcium oxide.

3. Composition of claim 15 in which the oxide is zinc oxide.

4. Composition of claim 15, in which the cellulose nitrate has a viscosity characteristic of less than 5 seconds, as determined in accordance with A. S. T. M. specifications D-301-33, Formula B.

5. Composition of claim 15 in which the cellulose nitrate, vegetable oil and resin ingredients are present in proportions between 10 parts by weight of cellulose nitrate, 1 part of vegetable oil, 10 parts of resin and 10 parts of cellulose nitrate, 5 parts of vegetable oil and 25 parts of resin.

6. Composition of claim 16 in which the cellulose nitrate, vegetable oil, resin and plasticizer ingredients are present in proportions between 10 parts by weight of cellulose nitrate, 1 part of vegetable oil, 10 parts of resin, 1.5 parts of plasticizer and 10 parts of cellulose nitrate, 5 parts of vegetable oil, 25 parts of resin and 4.5 parts of plasticizer.

7. Composition of claim 15 in which the vegetable oil is characterized by an iodine number of about 5.8 and a saponification number of about 180.

8. Composition of claim 15 in which the vegetable oil is cocoanut oil.

9. Composition of claim 16 in which the plasticizer is ortho cresyl paratoluene sulfonate.

10. Process for rendering vegetable oils suitable for incorporation in cellulose nitrate coating compositions adapted for finishing wood surfaces, which comprises heating the vegetable oil with about 3.5% by weight of magnesium oxide at about 265° C. until solution is effected.

11. Process for rendering vegetable oils suitable for incorporation in cellulose nitrate coating compositions adapted for finishing wood surfaces, which comprises heating cocoanut oil with about 3.5% by weight of magnesium oxide at about 265° C. until solution is effected.

12. A composition adapted for coating wood and like porous surfaces comprising cellulose nitrate, cocoanut oil reacted with magnesium oxide at an elevated temperature until said oxide is substantially completely dissolved and dewaxed damar resin in the ratio of about 10 parts of cellulose nitrate, 3.3 parts of said cocoanut oil and 15.2 parts of dewaxed damar resin dispersed in suitable solvents and diluents.

13. A composition adapted for coating wood and like porous surfaces comprising cellulose nitrate, cocoanut oil reacted with magnesium oxide at an elevated temperature until said oxide is substantially completely dissolved, dewaxed damar resin and a solvent plasticizer, in the ratio of 10 parts of cellulose nitrate, 3.3 parts of said cocoanut oil, 15.2 parts of dewaxed damar resin and 3.2 parts of said plasticizer dispersed in suitable solvents and diluents.

14. A composition adapted for coating wood and like surfaces comprising cellulose nitrate, cocoanut oil reacted with an oxide of a metal of Group 2 of the Periodic Table at an elevated temperature until said oil has an iodine number of about 5.8 and a saponification number of about 180.

15. A composition adapted for coating wood and like surfaces comprising cellulose nitrate, a vegetable oil reacted with an oxide of a metal of Group 2 of the Periodic Table at an elevated temperature until said oxide is dissolved and a resin, dispersed in solvents and diluents.

16. A composition adapted for coating wood and like surfaces, comprising low viscosity cellulose nitrate, a vegetable oil reacted with an oxide of a metal of Group 2 of the Periodic Table at an elevated temperature until said oxide is dissolved, a resin and a plasticizer, dispersed in solvents and diluents.

17. A composition adapted for coating wood and like surfaces comprising low viscosity cellulose nitrate, a vegetable oil reacted with an oxide of a metal of Group 2 of the Periodic Table at an elevated temperature until said oxide is dissolved, a resin and a solvent plasticizer for the cellulose nitrate selected from the group consisting of aryl sulfonates and sulfonamides and alkyl esters of phosphoric acid.

18. A wood article carrying a surface coating comprising low viscosity cellulose nitrate, a vegetable oil reacted with the oxide of a metal of Group 2 of the Periodic Table at an elevated temperature until said oxide is dissolved, and a resin.

19. A wood or like article carrying a surface coating comprising low viscosity cellulose nitrate, a vegetable oil reacted with the oxide of a metal of Group 2 of the Periodic Table at an elevated temperature until said oxide is dissolved, a resin and a solvent plasticizer for the cellulose nitrate selected from the group consisting of aryl sulfonates and sulfonamides and the alkyl and aryl esters of phosphoric acid.

20. Process for rendering vegetable oils suitable for incorporation in cellulose nitrate coating compositions adapted for finishing wood surfaces, which comprises reacting the vegetable oil with an oxide of a metal of Group 2 of the Periodic Table at an elevated temperature until said oxide is dissolved.

21. A composition adapted for coating wood and like surfaces comprising cellulose nitrate, a vegetable oil reacted with an oxide of a metal of Group 2 of the Periodic Table at about 265° C. until said oxide is dissolved, and a resin, dispersed in solvents and diluents.

WALTER NEBEL.